United States Patent [19]

Barclay

[11] Patent Number: 4,914,994
[45] Date of Patent: * Apr. 10, 1990

[54] AUTOMATED APPARATUS FOR DEBEADING OF SCRAP TIRES

[76] Inventor: Randel L. Barclay, 5616 Carpenter Rd., Stockton, Calif. 95205

[*] Notice: The portion of the term of this patent subsequent to Apr. 19, 2005 has been disclaimed.

[21] Appl. No.: 181,967

[22] Filed: Apr. 15, 1988

Related U.S. Application Data

[63] Continuation-in-part of Ser. No. 1,686, Jan. 9, 1987, Pat. No. 4,738,172.

[51] Int. Cl.$^4$ .................. B02C 18/06; B02C 23/02
[52] U.S. Cl. .......................................... 83/18; 83/19; 83/175; 83/176; 83/417; 83/419; 83/495; 83/675; 83/923; 83/951
[58] Field of Search ............... 83/13, 18, 19, 51, 54, 83/175, 272, 280, 488, 559, 560, 923, 925 R, 176, 417, 419, 495; 241/DIG. 31; 198/443, 461, 579

[56] References Cited

U.S. PATENT DOCUMENTS

| | | | |
|---|---|---|---|
| 3,460,419 | 8/1969 | Branick | 83/490 |
| 3,843,074 | 10/1974 | Tupper | 241/222 |
| 3,911,772 | 10/1975 | Kisielewski | 83/278 |
| 3,976,499 | 8/1976 | Tilby | 198/461 |
| 4,450,738 | 5/1984 | Tupper et al. | 82/101 |
| 4,738,172 | 4/1988 | Barclay | 83/18 |

FOREIGN PATENT DOCUMENTS

| | | | |
|---|---|---|---|
| 3413614 | 10/1985 | Fed. Rep. of Germany | 241/DIG. 31 |
| 53-34235 | 9/1978 | Japan | 83/923 |
| 937226 | 6/1982 | U.S.S.R. | 241/DIG. 31 |
| 2045108 | 10/1980 | United Kingdom | 241/DIG. 31 |

Primary Examiner—Hien H. Phan
Attorney, Agent, or Firm—Thomas Schneck

[57] ABSTRACT

An apparatus for removing the bead wires from a scrap tire having a pair of overlapping and counterrotating shearing members mounted on a movable carriage. The carriage provides reciprocating motion to the shearing members between two shearing work stations. While shearing action takes place at a first work station a scrap tire is fed into the adjacent work station, whereafter the bead wires of the scrap tire are first elongated and then compressed into overlying adjacent positions. Advancement of the shearing members into the tire produces a first tire shear that is at least closely tangential to the bead wires. When the pinch point of the shearing members is proximate the bead wires forward movement of the carriage is ceased. However, the tire is caused to rotate about its axis by the shearing members to produce a second shear that is substantially concentric with the bead wires, the first and second shears being a single continuous motion. Scrap tires are fed to the shearing work stations by a conveyor system having a plurality of inclined conveyors, with downstream conveyors operated at increasing conveyor velocity.

17 Claims, 7 Drawing Sheets

AUTOMATED APPARATUS FOR DEBEADING OF SCRAP TIRES

CROSS REFERENCE TO RELATED PATENTS

The present invention is a continuation-in-part of application Ser. No. 001,686, filed Jan. 9, 1987, now U.S. Pat. No. 4,738,772.

TECHNICAL FIELD

The present invention relates to apparatus for removing the bead wires from a scrap tire for transportation or further reduction in other equipment.

BACKGROUND ART

To date, the problems of disposing, storing and transporting discarded tires are many and varied. In recycling tires for fuel, scrap tires are normally cut into small chips. This has generally proved not to be cost effective since the cost of collecting, transporting and cutting the tires is frequently more than the return in value as fuel.

The dimensions of a tire make it difficult to stack tires in a low volume. In transporting tires to a recycling plant, motor trucks at times carry only about one-half of a full load by weight. Since a motor truck not loaded to its full weight potential costs very nearly as much to operate as one that is, the cost effectiveness of recycling scrap tires may be increased by increasing the weight load carried by the motor truck.

The weight load of scrap tires that may be carried by a motor truck can be increased by cutting the scrap tires into smaller pieces prior to placement into a motor vehicle. U.S. Pat. No. 3,911,772 to Kisielewski discloses a mobile material cutter that makes a diametrical cut across a tire to halve the tire. While this halving of a tire permits an increased weight load for motor vehicles, a full load is still not possible. Likewise, quartering of a tire still will not permit full load transportation.

Tires are highly resilient. This resiliency is a result of bead wires which are positioned within the circumferential surface of the inside diameter of each side wall. Resiliency is necessary for the proper functioning of a tire but makes stacking, storing and reducing scrap tires burdensome. It is therefore desirable to remove the bead wires from a tire after the tire is no longer usable.

Not all scrap tires are recycled. Many tires are buried in land fills. However, tire carcasses have an inherent resistance to burial and a tire buried under five feet of dirt will often be back at the surface in ten years. Strict regulations have been enacted to govern burial of discarded tires. Again, it is critical to remove the bead wires from a tire. Devices for debeading a scrap tire are known. Such devices, however, are typically time consuming and labor intensive since an operator cuts one tire at a time after placing the tire over a cylindrical drum. Moreover, such devices are often inefficient.

An object of the present invention is to provide an apparatus which separates the bead wires of a tire from the outer casing. A further object is to provide such an apparatus which is both time and cost efficient.

DISCLOSURE OF THE INVENTION

The above objects have been met by a tire debeader which continuously circumferentially shears a tire about its bead wires during distinct relative motions between the tire and a pair of shearing members. A first cut, or shear, results from linear motion of the counter-rotating circular shearing members in a direction that is at least closely tangential to the bead wires of the tire. When the first cut reaches a point at or near the bead wires, the linear movement of the shear members is ceased. However, the shearing force continues to draw the tire and causes rotational tire movement, thereby making a second cut which is substantially concentric with the inside circumference of the tire. As a result of the sequential cuts, the bead wires are completely disembodied from the outer casing of the tire. With the bead wires removed, tires may be rolled into a spiral for transportation or storing, significantly reducing the required space.

The linear movement of the shear members is a reciprocating movement between two substantially identical adjacent shear stations. Each shear station includes a plurality of guide rolls spaced apart to contact various areas within the inside diameter of a scrap tire. The guide rolls include a tensioning roll linked to an air or hydraulic cylinder so that actuation of the cylinder causes the tensioning roll to elongate the tire. Each shear station further includes compression rollers which exert a force on the bead wires to bring the bead wires into overlying adjacent positions.

After the bead wires of a tire in a shear station have been deformed by the guide rollers and brought into overlying adjacent positions by the compression rollers, the linear movement of the shear members causes the first cut or shear. When the pinch point created by the shearing members is proximate the bead wires, linear movement is ceased, but a saw-tooth circumference of each shearing member creates a pull that causes the tire to begin to rotate. As the tire rotates, the outer casing of the tire is disembodied from the bead wires.

While shearing takes place at one shear station, the adjacent shear station is being loaded with a scrap tire. Therefore, at all times the shearing members either are executing a shear or are being moved into a position to begin execution of a shear. The shear stations are provided with a supply of tires by a system of conveyors. At least three and preferably four conveyors are utilized. The upstream conveyors have a dispensing end which is elevated relative to the receiving end of the conveyor.

Tires are loaded onto the receiving end of a first conveyor. The elevated dispensing end of the first conveyor is in material transfer relation with the receiving end of a second conveyor. The rate of rotation of the second conveyor exceeds the rate of rotation of the first conveyor. The elevated dispensing end of the second conveyor is in material delivery relation with a third conveyor having a rate of rotation exceeding that of the second conveyor. This system of ascending conveying velocity continues until a stockpile of scrap tires has been reduced to a single file delivery to the shear stations.

An advantage of the present invention is that it provides an automated tire debeading apparatus. Another advantage is that by compressing and elongating the bead wires, the angle of attack of shearing members into a scrap tire is independent of the diameter of the tire. Thus, the present invention may be used to debead various size tires without adjustment of the apparatus.

BEST MODE FOR CARRYING OUT THE INVENTION

Figure 1:
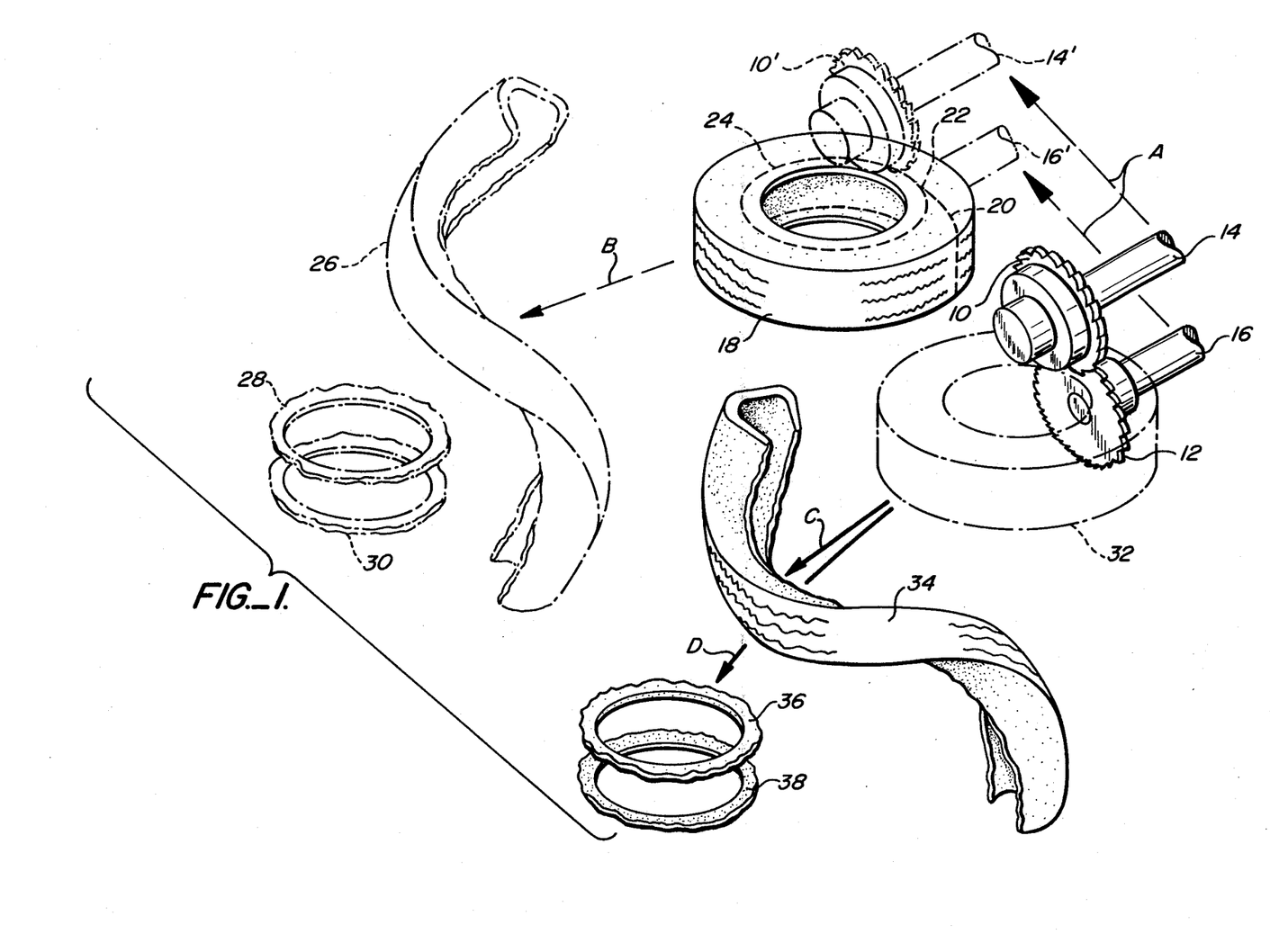
FIG. 1 is a plan view of the tire debeading operation carried out by utilization of the present invention.

With reference to FIG. 1, a pair of counterrotating shears 10 and 12 are fixed to parallel shafts 14 and 16 that are rotatably mounted to a carriage, not shown. Linear movement of the carriage displaces the shafts 14 and 16 in the direction of Arrows A and brings the counterrotating shears 10 and 12 into contact with a tire 18. The movement in the direction of Arrows A produces a first cut 20 in the tire. This first cut is through the crown portion and the side walls of the tire 18. When the shears reach a point 22 at which the pinch point of the shears is near the bead wires of the tire, linear movement of the shears 18 and 20 is ceased. However, saw teeth on the circumference of the shears continue to draw the tire towards the shears, producing a second cut 24 that is concentric with the inside circumference of the tire. The outer casing 26 of the tire 10 thereafter travels past the shears, as indicated by Arrow B. In this manner, the outer casing 26 is disembodied from a pair of bead wires 28 and 30 previously located at the inside circumference of the tire.

Parallel shafts 14' and 16' and shear 10' illustrate a first extreme position of the shearing devise. With the shearing devise in the first extreme position, the first cut 20 of the tire 18 will have been completed and the second cut 24 will at least have been started. During execution of these cuts, a second tire 32 is loaded into a second work station, not shown. Return of the shears 10 and 12 to the original position causes debeading of the second 32. Again, the outer casing 34 of the tire is removed from the bead wires 36 and 38, as shown by Arrows C and D respectively. As shearing takes place at one work station, a scrap tire is loaded into the adjacent work station. Reciprocating motion of the shears 10 and 12 provide an efficient manner of debeading a stockpile of scrap tires.

Figure 2:
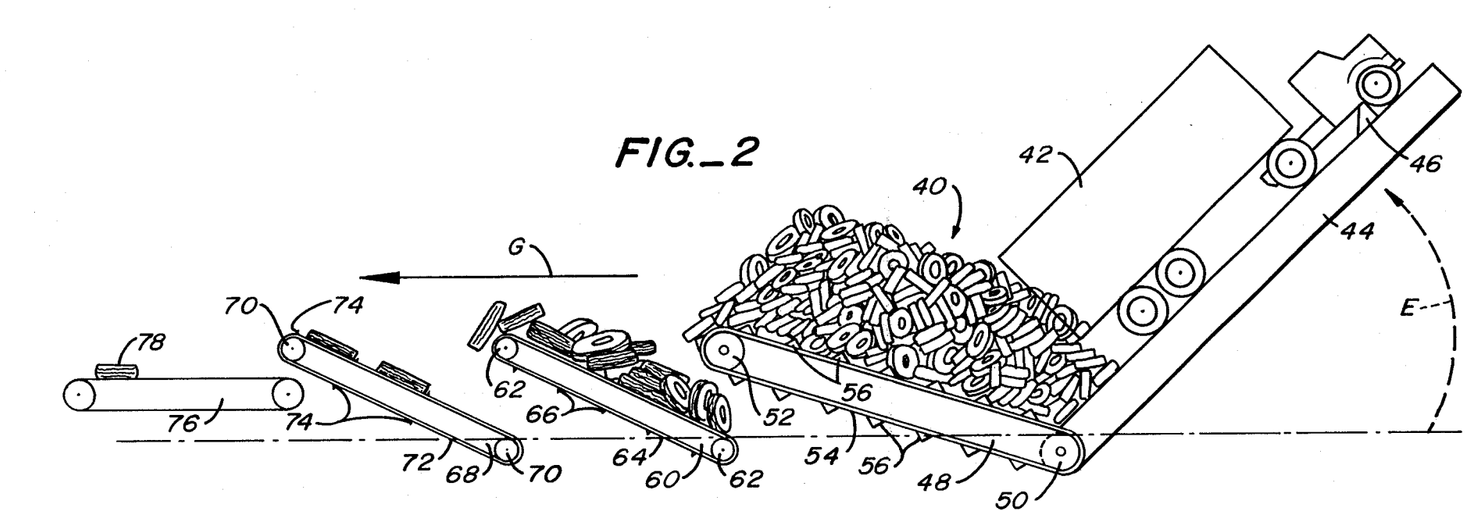
FIG. 2 is a side plan view of a material handle system for utilization with the present invention.
Figure 3:
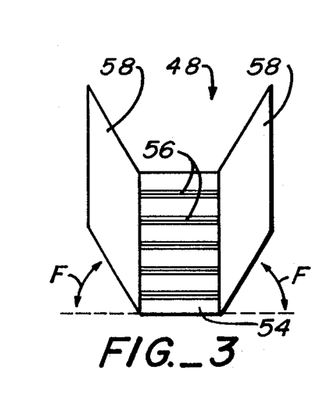
FIG. 3 is a top view of a load conveyor of FIG. 2.
Figure 4:
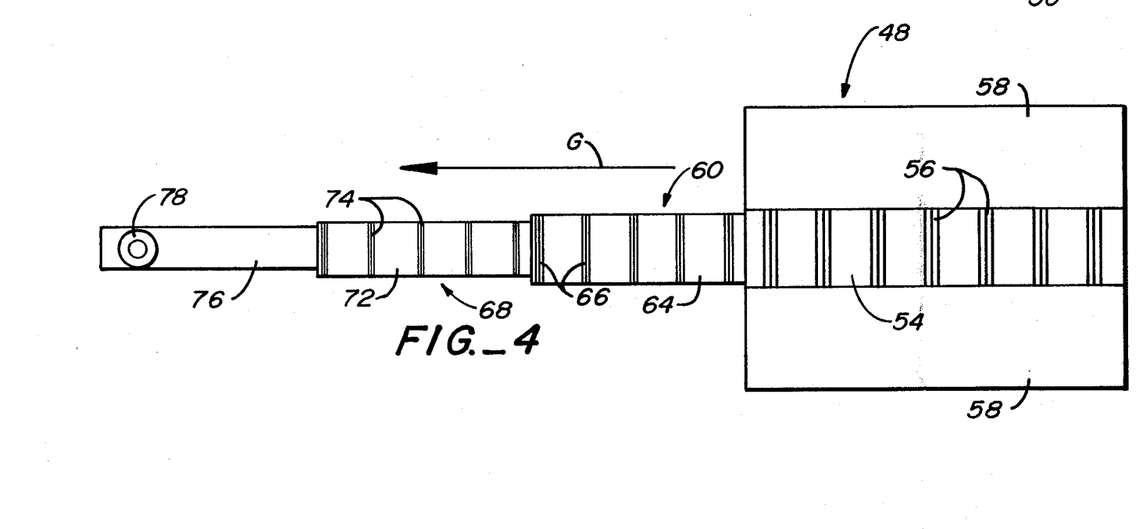
FIG. 4 is a top view of the conveyor system of FIG. 2.

Referring now to FIGS. 2–4, a conveyor system for delivery of scrap tires to shear stations is shown. A stockpile of tires 40 is removed from a motor truck 42 by operation of a tilt hoist 44. The tilt hoist 44 is of the type presently used in the removal of refuse from a motor truck. A stop block 46 is employed to prevent movement of the motor truck as the tilt hoist is pivoted, as shown by Arrow E.

The stockpile 40 of scrap tires is deposited on a load conveyor 48. The load conveyor includes at least two rollers 50 and 52 which drive an endless belt 54. Preferably, the endless belt is a chain having projections 56 which exert a force on the tires in the direction of conveyor rotation As shown in FIG. 3, the load conveyor 48 includes bulkheads 58 to facilitate loading. The bulkheads may be selectively pivoted, as shown by Arrows F, to vary the capacity of the load conveyor 48.

Under normal conditions, the load conveyor 48 operates at an extremely slow rate of rotation. For example, the conveying velocity of the load conveyor may be 1 foot per minute. However, photoelectric sensors detect the presence or absence of tires on the load conveyor. A signal from a sensor will increase the conveying velocity of the conveyor to insure adequate delivery of tires from the load conveyor.

The material dispensing end associated with roller 52 of the load conveyor 48 is elevated relative to the material receiving end. Moreover, the dispensing end is in material transfer relation with a second conveyor 60. The second conveyor has a structure functionally equivalent to the load conveyor 48, having opposed rollers 62 which drive an endless belt 64. Ledges 66 on the endless belt 64 catch tires dispensed from the load conveyor 48.

Like the load conveyor 48, the second conveyor 60 has an elevated dispensing end. The conveying velocity of the second conveyor is significantly greater than the velocity of the load conveyor. Typically, the endless belt 64 of the second conveyor has a rotational speed of approximately 20 feet per minute.

Scrap tires from the second conveyor are deposited onto a third conveyor 68 having opposed rollers 70, an endless belt 72 and belt ledges 74. The third conveyor again elevates scrap tires and deposits the scrap tires on yet another downstream conveyor. In contrast to the upstream conveyors, a delivery conveyor 76 progresses a tire 78 along a horizontal plane. While the conveying velocity of the third conveyor 68 is approximately 40 feet per second, the velocity of the delivery conveyor 76 is 60 feet per minute.

The conveying system shown in FIGS. 2 and 4 progresses tires in the direction of Arrow G. The conveying velocity increases substantially as the tires are moved downstream. In this manner, as tires are deposited on each succeeding conveyor 48, 60, 68 and 76, further separation between tires takes place. The stockpile 40 of tires on load conveyor 48 is deposited on the second conveyor 60 in groups of tires. Individual tires from the groups of tires fall from the second conveyor onto the third conveyor 68. The speed of the third conveyor 68 relative to the second conveyor 60 separates the tires falling from the second conveyor. Single file delivery of tires is insured by operation of a delivery conveyor 76 at yet a greater conveying velocity. Separation of tires is facilitated by inclined conveyors 48, 60 and 68, which utilize gravitational force to disassociate tires stacked atop one another.

As noted above, the load conveyor 48 includes photoelectric sensors which detect the presence of scrap tires on the load conveyor. The conveying velocity of the load conveyor is increased after the scrap pile 40 of tires has been reduced in size. The delivery conveyor 76 also includes photoelectric sensors, not shown. The sensors of delivery conveyor 76 detect the presence of scrap tires, as well as the height of tires to be debeaded.

As may be seen FIG. 4, the delivery conveyor 76 has a width less than that of the third conveyor 68. The width of the delivery conveyor 76 should accommodate the various sizes of tires to be debeaded, but because the tires progress in a single-file manner, the width may not be as great as preceding conveyors 48, 60 and 68. As shown in FIG. 4, the width of a conveyor is less than the width of preceding conveyors.

Figure 5:
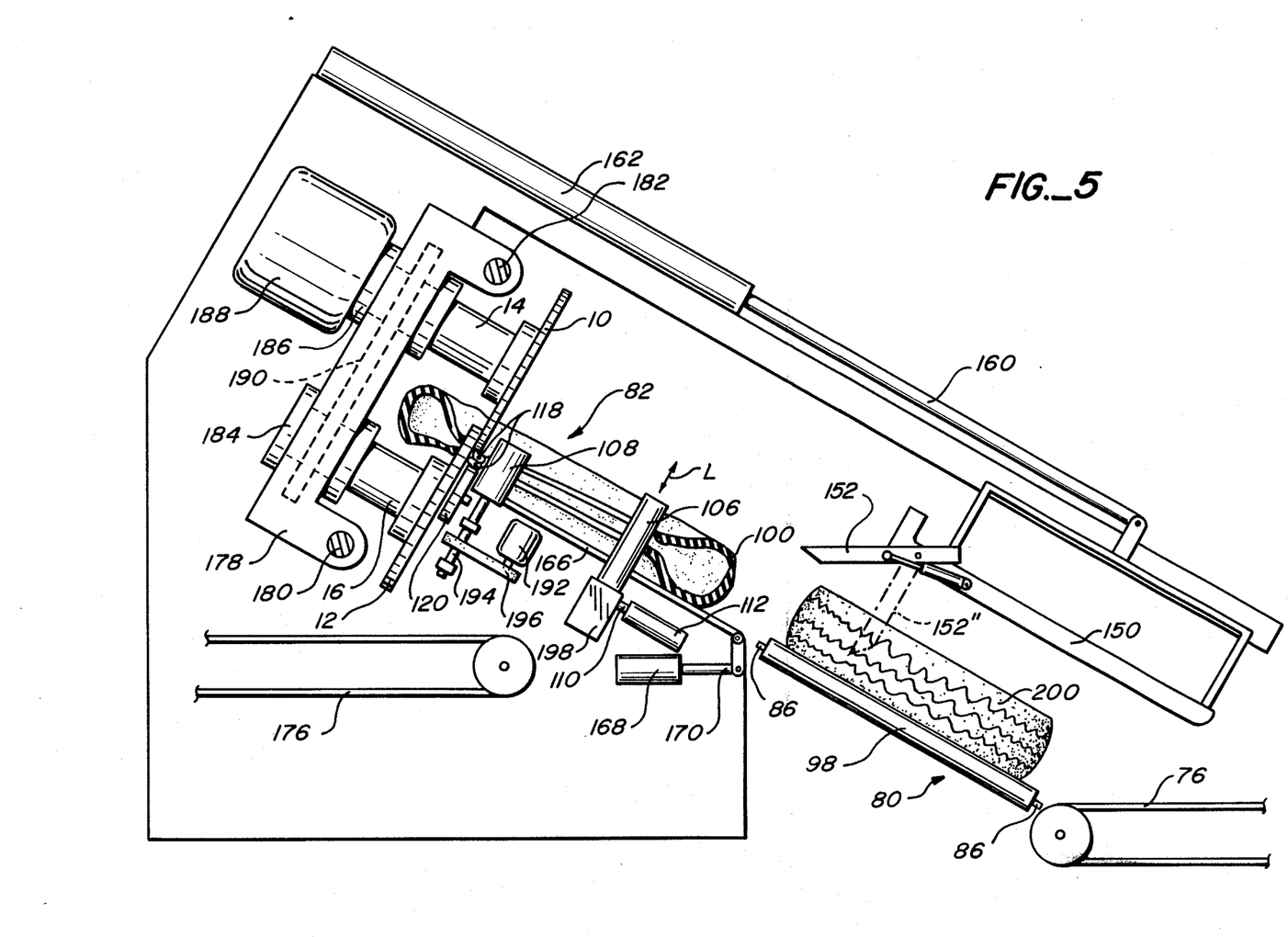
FIG. 5 is a schematical side view of a tire debeading apparatus in accord with the present invention.
Figure 6:
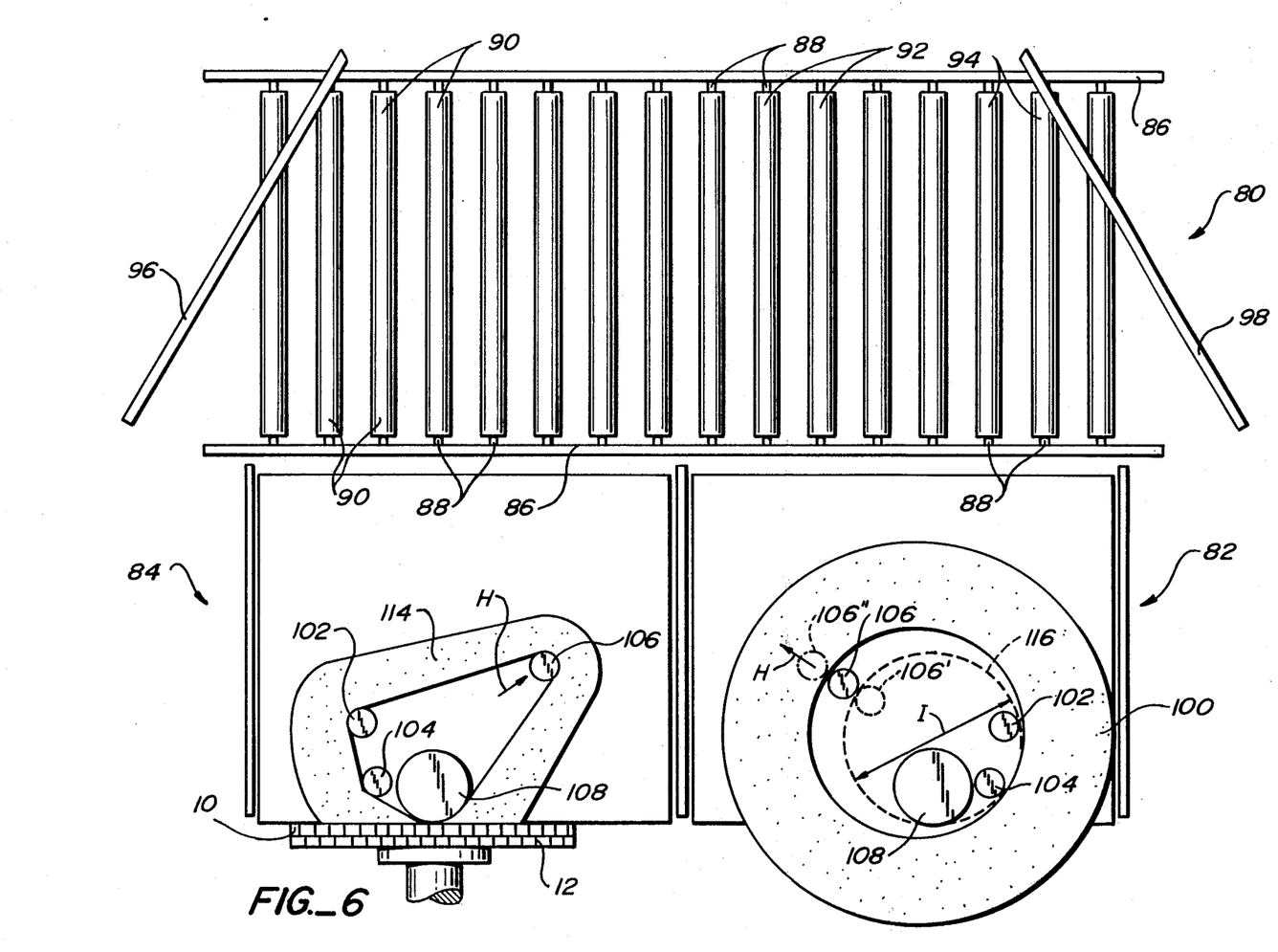
FIG. 6 is a schematical top view of the shearing work stations of FIG. 5.

Referring now to FIGS. 5 and 6, tires from the delivery conveyor 76 progress onto a tire-sorting roller assembly 80. The roller assembly aligns tires for alternatingly feeding scrap tires into a first shearing work station 82 and a second shearing work station 84. Parallel brackets 86 support rotating roller shafts 88 upon which rollers 90, 92 and 94 are fixed. Angle brackets 96 and 98 are suspended above the outermost rollers. The rollers 90 at the left of the tire-sorting roller assembly 80, as viewed in FIG. 6, continuously rotate in a counterclockwise direction to move tires against the associated angle bracket 96. Conversely, rollers 94 on the right side of the tire-sorting roller assembly rotate clockwise to exert a force upon a tire in the direction of the associated angle bracket 98. Movement of a tire to the counterclockwise rollers 90 or to the clockwise rollers 94 is determined by rotation of the center rollers 92. The direction of rotation of the center rollers 92 alternates so that tires are fed into the shearing work stations 82 and 84 in an efficient manner. The brackets 96 and 94 are angled such that as a tire makes contact with an angle bracket, lateral movement of the tire will cease and the inside diameter of the tire will be aligned for feed to a work station. The angle brackets 96 and 98 properly align tires of various sizes.

A tire 100 in the first shearing work station 82 is in contact with a plurality of rolls. Upright idler rolls 102 and 104 contact the tire 100 along spaced apart areas of the inside circumference of the tire. A movable tensioning roll 106 and a bead guide roll 108 also contact the inside circumference so that the tire is fixed in position. It is understood that the rolls 102-108 are not limited to the cylindrical configuration illustrated in the drawings. The rolls may be semicircular posts or may have any other configuration which does not restrict rotation of the tire about its axis. The cylindrical configuration, however, is preferred so that the rolls may be allowed to rotate during debeading of the tire.

The movable tensioning roll 106 enables the shearing work station to disembody a variety of sized tires. Critical to operation of the machine, as illustrated, is that the bead wires of the tire be crowded against the bead guide roll 108 when shearing takes place. The tensioning roll 106 insures that the bead wires are elongated and do, in fact, crowd the bead guide roll.

The tensioning roll 106 is mounted to a piston rod 110 of a tensioning air or hydraulic cylinder 112. The tensioning air cylinder 112 permits movement of the tensioning roll 106 from a first extreme position 106' to a second extreme position 106". The piston rod is extended in accordance with the air or hydraulic pressure applied by the cylinder 112. The movement of the piston rod is translated to the tension roll 106. As the piston rod is retracted into the tensioning air or hydraulic cylinder, the tensioning roll is moved in the direction of Arrow H to elongate the bead wires of the tire 100. Elongation of the bead wires crowds the bead wires against the idler rolls 102 and 104 and against the bead guide roll 108. Proper elongation is shown by the tire 114 in the second work station 84, which is identical to the first work station 82.

Elongation of the bead wires permits the counterrotating shears 10 and 12 to have a standard angle of attack regardless of the dimensions of the tire. Typically, the rolls 102, 104 and 108 are arranged to provide for an arc having a 6½ inch radius. This dimension is illustrated by Arrow I and circle 116 of work station 82.

Even after elongation of the bead wires, a tire is not aligned properly for the shears 10 and 12 to make the desired cuts. The bead wires must be compressed into overlying adjacent positions shown by bead wires 118 in FIG. 5. The figure shows a lower compression roller 120, but for the purpose of clarity the mechanism for exerting compression force upon the upper bead wire is not shown in FIGS. 5 and 6. The downward force on the bead wires is provided by a precompression roller 122 and an upper compression roller 124 shown in FIGS. 7 and 8. The precompression roller and upper compression roller are rotatably mounted to upright plates 126 and 128 that are each attached to a fixed plate 130. Below the fixed plate 130 is a pivoting plate 132, with both plates 130 and 132 being mounted to a reciprocating rod 134.

Figure 7:
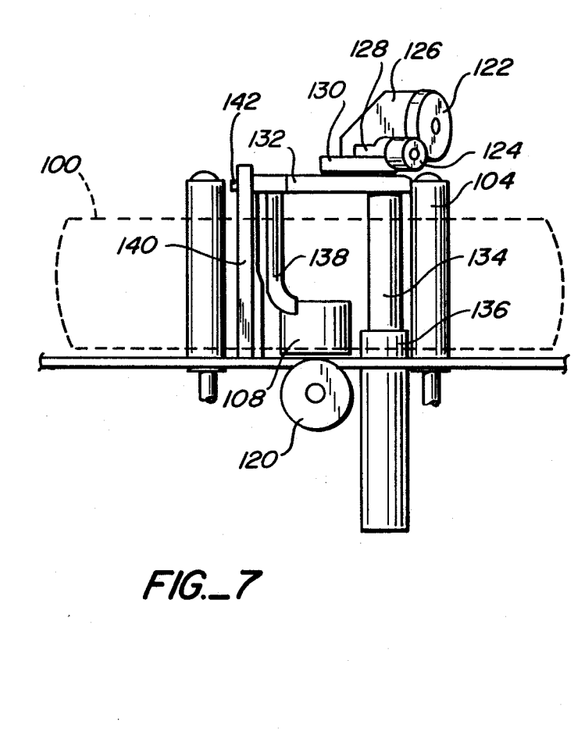
FIG. 7 is a side view of an upper compression assembly for the apparatus of FIG. 5.
Figure 8:
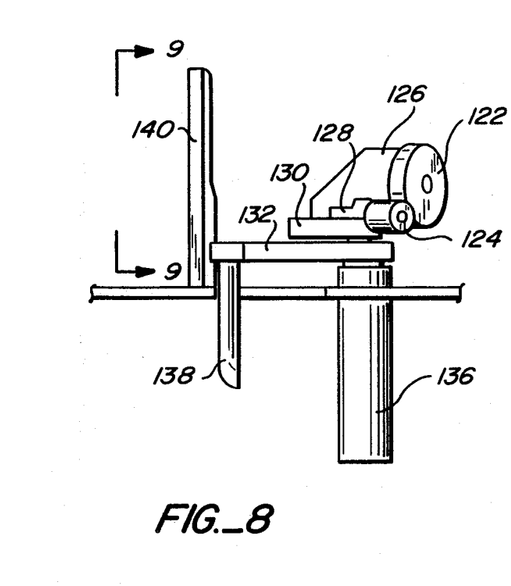
FIG. 8 is a side view of the assembly of FIG. 7 in a load position.

The upper compression assembly of FIG. 7 is shown in an unloaded position. In this position, the precompression roller 122 and the compression roller 124 are held upright by the reciprocating rod 134. Movement of the reciprocating rod is provided by actuation of a hydraulic cylinder 136. FIG. 8 illustrates the upper compression assembly in a loaded position.

Figures 9, 10:
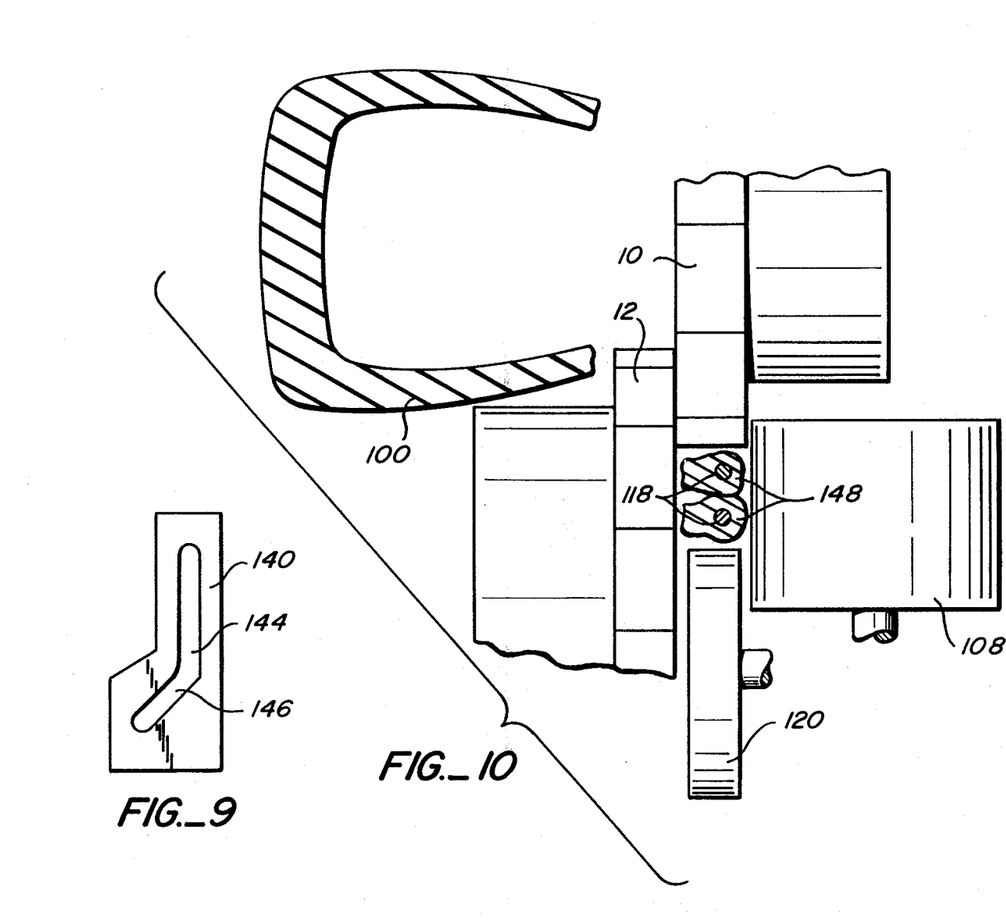
FIG. 9 is a rear view of a plate taken along lines 9—9 of FIG. 8.
FIG. 10 is a front view of the apparatus of FIG. 5 in a shearing operation.

In the unloaded position of FIG. 7, the height of the tire 100 prevents an upper bead wire from contacting the bead guide roll 108. For this reason, a hooked crowding bar 138 is positioned such that the upper bead wire will be pressed against the crowding bar 138. Preferably, the crowding bar has a length that causes both the upper and the lower bead wires to be crowded against the bar when the bead wires are elongated. As the reciprocating rod 134 is retracted into the hydraulic cylinder 136, the rollers 122 and 124 exert a compression force onto the upper bead wire. When the bead wires are brought into adjacent overlying positions in alignment with the bead guide roll 108, the crowding bar 138 has served its purpose. Thus, a slotted plate 140 pivots the pivoting plate 132 so that the crowding bar is moved out of the way of the shears and the bead wires are crowded against the bead guide roll 108. FIG. 9 is a rear view of the slotted plate 140 which contacts the pivoting plate 132 of FIG. 7. The pivoting plate has a projection 142 which is slidably connected to the slotted plate. The slot has a vertical portion 144 which, by means of guiding the projection 142, guides the crowding bar 138 so as to descend for alignment of the bead wires with the bead guide roll 108. Then, when the bead wires are properly aligned, the slanted portion 146 of the slotted plate 140 pivots the pivoting plate 132. As the upper compression assembly is brought into a loaded position, the lower compression roller 120 of FIG. 7 is correspondingly moved upwardly to exert a force on the lower bead wire.

Referring briefly to FIG. 10, the inner peripheries of the side walls 148 of a tire are shown captured against the bead guide roll 108. The lower compression roller 120 prevents the bead wires 118 of the tire from being pushed away from the pinch point of the counterrotating shears 10 and 12. Thus, the outer casing of a tire 100 is removed from the bead wires by the shearing action.

Figure 11:
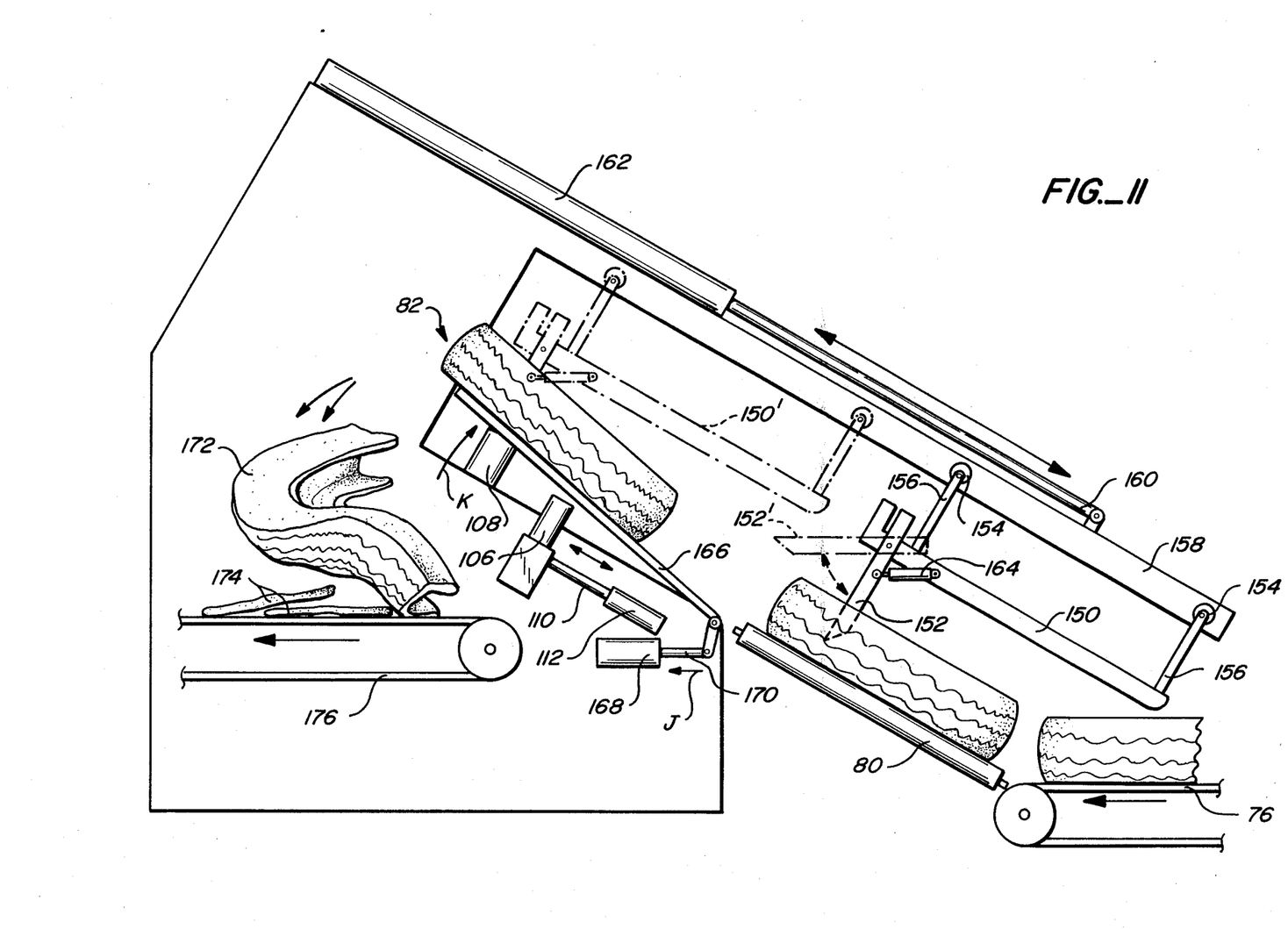
FIG. 11 is an operational view of the apparatus of FIG. 5.

The automated process of shearing a stockpile of scrap is illustrated in FIG. 11. A tire on the delivery conveyor 76 is received by the tire-sorting roller assembly 80. The roller assembly aligns the tire for linear feed into a shearing work station 82. A trolley 150 having a pivoting contactor arm 152 is employed to feed the tire into the work station. Wheels 154 are rotatably fixed to trolley legs 156. The circumference of the wheels 154 contact a rail 158. Displacement of the trolley 150 is determined by extension of a hydraulic rod 160 from a cylinder 162. As the hydraulic rod is extended, the trolley 150 is moved downwardly into a pickup position, during which time the contactor arm is held horizontally as shown by 152'. In the pickup position, the air cylinder 164 pivots the contactor arm 152 into the center of a tire. The trolley 150 is then moved upwardly to the position indicated by trolley 150'. A tire is thereby rested on a table 166 of the work station 82.

Table positioning cylinder 168 selectively displaces a rod 170 in the direction of Arrow J to pivot the table 166, as shown by Arrow K. The pivoted table permits a tire to slide across the table without interference from the tensioning roll 106 and the bead guide roll 108.

After a tire has been properly stationed on the table 166, the table positioning cylinder 168 operates to move the rolls 106 and 108 into the center of the tire, whereafter the trolley 150 proceeds for pickup of the next tire. The bead wires of the tire are then elongated and compressed into overlying positions so that the bead wires may be disembodied from the outer casing of the tire. Movement of the next tire into the shearing work station 82 pushes the outer casing 172 and bead wires 174 of a tire onto a transport conveyor 176.

Referring again to FIG. 5, the shears 10 and 12 are fixed to shafts 14 and 16 which are rotatably mounted to a carriage 178. The carriage selectively slides along rails 180 and 182. Movement of the carriage 178 along rails 180 and 182 provide linear motion between adjacent shearing work stations.

The shear shafts 14 and 16 are rotatably fitted within bearings 184 and 186 that are supported by the carriage 178. A shear drive motor 188 directly drives the shaft 14 of the upper shear 10. Rotational motion is translated to the lower shear shaft 16 by synchronized drive gear set 190.

To facilitate the shearing action about the bead wires of a tire 100, the bead guide roll 108 is rotated by operation of an hydraulic motor 192 which is coupled to a bead guide roll shaft 194 by a drive belt 196. While rotation of the bead guide roll 108 is preferred, such rotation is not critical since the saw teeth of the shears 10 and 12 cause rotation of the tire 100 during shearing action.

As shown by Arrow L, the tensioning roll 106 may be moved in a second dimension. The tensioning roll is selectively retracted into casing 198 when the table is pivoted upwardly by table positioning cylinder 168. Retraction of the tensioning roll eliminates the risk of the tensioning roll interfering with passage of a tire as the trolley contactor arm 152" escorts a tire 200 across the table.

In operation, the first cut 20 shown in FIG. 1 is produced by linear movement of a carriage which transports the counterrotating shears 10 and 12 into the tire 18. When the tire reaches the location 20 at which the pinch point of the shears is near the bead wires of the tire, the carriage is stopped. However, saw teeth on the circumference of the shears continue to draw the tire into the shears, producing the second cut 24. Thus the bead wires 28 and 30 are disembodied from the outer casing 26 of the tire.

As shown in FIG. 5, prior to the shearing action the bead wires 118 of a tire 100 are elongated and compressed. Elongation of the bead wires is caused by actuation of a tensioning air or hydraulic cylinder 112 which controls movable tensioning roll 106. Displacement of the tensioning roll 106 crowds the bead wires against a rotatably driven bead guide roll 108. Elongation provides a standard angle of attack for shears 10 and 12 regardless of the diameter of the tire 100.

Compression force to bring the bead wires 118 into overlying adjacent positions is provided from below by a lower compression roller 120. The assembly which forces the upper bead wire downwardly has been omitted from FIG. 5, but may be seen in FIGS. 7 and 8. Precompression roller 122 and compression roller 124 insure that the bead wires are brought into overlying adjacent positions. By doing so, the bead wires are captured between the lower compression roller 120 and the upper shear 10 and between the lower shear 12 and bead guide roll 108.

Referring again to FIG. 5, after debeading of a tire 100, the carriage 178 is moved from the shearing work station 82 and table 166 is pivoted by actuation of the table positioning cylinder 168. Simultaneously, the tensioning roll 106 is retracted into casing 198. Thus, it is possible to slide the debeaded casing and bead wires of tire 100 from the table 166 onto the transport conveyor 176 by movement of a second scrap tire 200 onto the table 166. A trolley 150 feeds the tire 200 into the work station 82 at the same time that the shears 10 and 12 are debeading a tire in an adjacent work station. The bead wires of the tire 200 are elongated and compressed as the shears 10 and 12 return to the work station 82.

The conveyor system illustrated in FIG. 2 together with the shearing apparatus illustrated in FIGS. 5–11. provide an automated apparatus for debeading of a stockpile of scrap tires. The operation is both time and cost efficient and produces a tire carcass which is more easily transported and which facilitates further reduction of the carcass in other equipment.

I claim:

1. A method of removing the bead wires from a tire of a type having an inside diameter, a tire axis and opposed side walls, comprising, elongating the portion of a tire associated with bead wires disposed within the tire by applying a stretching force within an inside diameter of the tire, flattening the portion of a tire associated with bead wires disposed within the tire by applying a compression force upon a side wall of the tire at said bead wires, providing relative motion between the compressed tire and a shearing device, said relative motion being a linear advancement of said shearing device drawing together the tire and said shearing device, effecting a first shear into the compressed tire by said linear advancement, said first shear being in a direction that is at least closely tangential to the bead wires within the tire, ceasing linear advancement of the tire when the bead wires are adjacent said shearing device, and effecting a second shear of the tire by rotating the tire about a tire axis.

2. An apparatus for debeading a tire of the type having opposed first and second side walls, said first and second side walls each having an inner circumferential edge and a bead wire closely adjacent said inner circumferential edge, comprising, a tire positioning means for contacting inner circumferential edges of first and second side walls of a tire and for elongating said inner circumferential edges, compression means operatively associated with said tire positioning means for exerting a compression force on at least one side wall of said tire at said inner circumferential edge in a direction bringing bead wires of each side wall into overlying adjacent positions, rotary shearing means for shearing said first and second side walls, and means for providing relative motion between said rotary shearing means and said tire, said rotary shearing means having an alignment to shear said first and second side walls to a location closely tangential to said bead wires in the course of said relative motion, whereafter rotation of said tire separates said bead wires from the radially outward portion of the tire.

3. The apparatus of claim 2 wherein said means for providing relative motion between said rotary shearing means and said tire includes (a) a shearing carriage and (b) a means for linearly moving said shearing carriage relative to said tire, said rotary shearing means mounted to said shearing carriage for linear motion therewith.

4. The apparatus of claim 3 wherein said tire positioning means and said compression means define a first shear station and wherein said apparatus includes a second shear station having a tire positioning means and a compression means substantially identical to said first shear station, said means for linearly moving said shearing carriage having a first linear extent placing said rotary shearing means at said location closely tangential to the bead wires of the tire of said first station and having a second linear extent which, relative to said second shear station, is substantially identical said first linear extent.

5. The apparatus of claim 2 further comprising at least three delivery conveyors for feeding a supply of tires to said tire positioning means, said delivery conveyors including first, second and third conveyors, each having a material receiving end and a material dispensing end, the material dispensing end of at least the first and second conveyor being elevated relative to the associated material receiving end, said first conveyor being in material delivery relation with said second conveyor and having a conveying velocity exceeded by the conveying velocity of said second conveyor, said second conveyor being in material delivery relation with said third conveyor and having a conveying velocity exceeded by the conveying velocity of said third conveyor.

6. The apparatus of claim 5 wherein the material receiving end of said second conveyor is at an elevation below the elevation of the material dispensing end of said first conveyor, and wherein the material receiving end of the third conveyor is at an elevation below the elevation of the material dispensing end of the second conveyor.

7. The apparatus of claim 5 wherein each conveyor includes a rotating endless belt and a drive means, said belt of the first conveyor rotating at a rate with the range of 0.25 ft/sec and 10 ft/sec, said belt of the second conveyor rotating at a rate with the range of 12 ft/sec and 32 ft/sec, said belt of the third conveyor rotating at a rate with the range of 35 ft/sec and 50 ft/sec.

8. The apparatus of claim 5 wherein the material dispensing end of the third conveyor is elevated relative to the material receiving end.

9. The apparatus of claim 2 wherein said rotary shearing means includes first and second counter-rotating circular shearing members, said first shearing member being supported on a first shaft and said second shearing member supported on a second shaft, said first and second shearing members being in overlapping shearing relation.

10. An apparatus for removing the bead wires from a tire comprising, a shearing means having at least two overlapping and counterrotating circular shears including a first shearing member supported on a first shaft and a second shearing member supported on a second shaft, said shafts spaced apart from each other by a distance less than a radius of said first shearing member to provide a pinch point between said shearing members, guide means for positioning a tire relative to said shearing means, said tire having an inside diameter and opposed side walls, each side wall having a bead wire, said tire having an axis, said guide means including a plurality of rolls disposed to contact the inside diameter of said tire, said guide means positioning said tire axis substantially perpendicular to the axes of said first and second shafts, tensioning means for elongating said bead wires of the opposed side walls, said tensioning means including a movable tensioning roll nonuniformly spaced from said rolls of the guide means, compression means for exerting a compression force on at least wall, bringing said bead wires of said of said side wall, bringing said bead wires of said opposed side walls into mutual proximity, and shear advancement means for displacing said first and second shearing members along a path of motion, said shear advancement means having a first extreme position and a second extreme position, movement into first extreme position carrying said shearing members into said tire to a location closely tangential to said bead wires.

11. The apparatus of claim 10 wherein said guide means, said tensioning means and said compression means define a first shear station, said apparatus further comprising a second shear station substantially identical to said first shearing station, movement of said shear advancement means into said second extreme position carrying said shearing members into a position to shear a tire in said second shear station.

12. The apparatus of claim 10 wherein said path of motion of said shear members is a linear path.

13. The apparatus of claim 10 wherein said shear advancement means includes a shear carriage slidably mounted on at least one rail.

14. The apparatus of claim 10 further comprising at least three delivery conveyors for feeding a supply of tires to said guide means, said delivery conveyors including first, second and third conveyors, each having a material receiving end and a material dispensing end, the material dispensing end of at least the first and second conveyor being elevated relative to the associated material receiving end, said first conveyor being in material delivery relation with said second conveyor and having a conveying velocity exceeded by the conveying velocity of said second conveyor, said second conveyor being in material delivery relation with said third conveyor and having a conveying velocity exceeded by the conveying velocity of said third conveyor.

15. The apparatus of claim 14 wherein the material dispensing end of the third conveyor is elevated relative to the material receiving end.

16. The apparatus of claim 10 wherein said shearing means includes saw-teeth disposed about the circumference of each shearing member.

17. The apparatus of claim 10 wherein said guide means includes a plurality of cylindrical rolls, each having an axis parallel said tire axis, said rolls including a tensioning roll slidably mounted for applying a stretching force to a portion of the tire.

* * * * *

UNITED STATES PATENT AND TRADEMARK OFFICE
CERTIFICATE OF CORRECTION

PATENT NO. : 4,914,994

DATED : April 10, 1990

INVENTOR(S) : Randel L. Barclay

It is certified that error appears in the above-identified patent and that said Letters Patent is hereby corrected as shown below:

Column 1, line 8, "U.S. Pat. No. 4,738,772" should read
- - U.S. Pat. No. 4,738,172 - -.

Column 3, line 1, "handle" should read - - handling - -.

Column 3, line 51, "second 32" should read - - second tire 32 - -.

Column 8, line 3, "controls movable" should read
- - controls a movable - -.

Claim 10, column 10, line 34, "on at least wall, bringing said bead wires of said of" should read - - on at least one side of said tire at the bead wire of - -.

Signed and Sealed this

Twenty-sixth Day of March, 1991

*Attest:*

HARRY F. MANBECK, JR.

*Attesting Officer*         *Commissioner of Patents and Trademarks*